Nov. 17, 1953 C. A. HENRY 2,659,611
STEERING DEVICE FOR TRAILERS
Filed Dec. 26, 1951 2 Sheets-Sheet 1
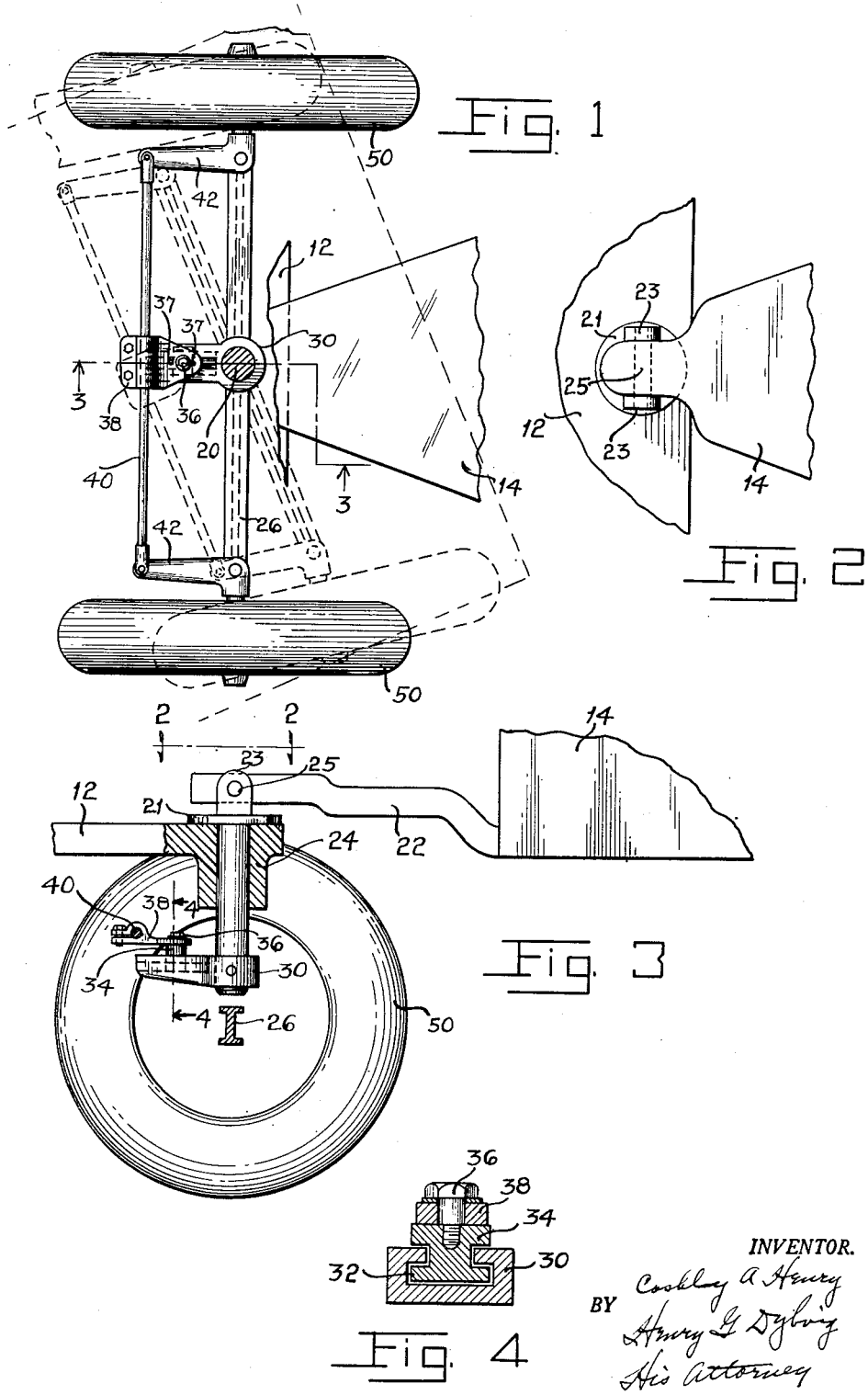

Nov. 17, 1953　　　　C. A. HENRY　　　　2,659,611
STEERING DEVICE FOR TRAILERS
Filed Dec. 26, 1951　　　　　　　　　　　2 Sheets-Sheet 2
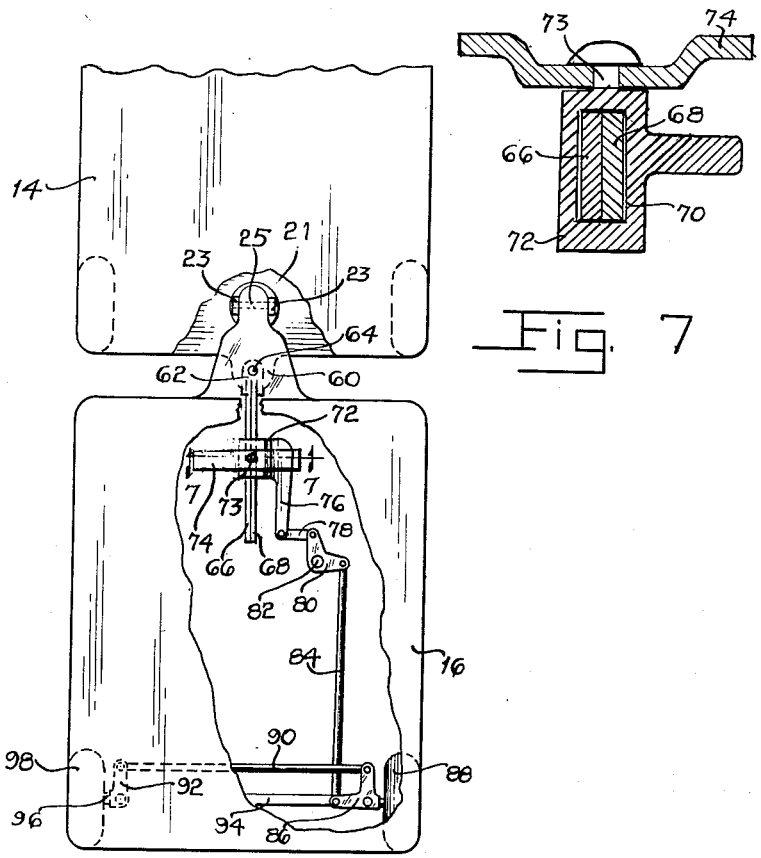
INVENTOR.
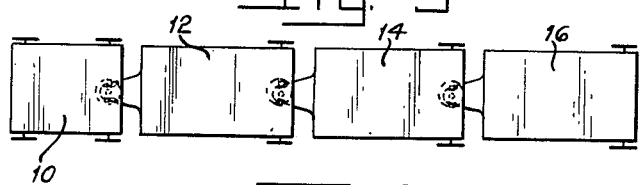

UNITED STATES PATENT OFFICE 2,659,611

STEERING DEVICE FOR TRAILERS

Cashly A. Henry, Dayton, Ohio

Application December 26, 1951, Serial No. 263,187

5 Claims. (Cl. 280—33.55)

This invention relates to a steering device for a trailer or a transportation assembly, wherein a plurality of articulated units are used and more particularly to the mechanism for guiding or steering the articulated units, especially when the units are negotiating a curve.

In connecting together a plurality of trailer units propelled or pulled by a tractor, the rear unit or units may remain practically idle if the tractor travels through a circular or oval path, unless some provision is made for steering the wheels of each of the trailer units. Various devices have been used in the past for steering the wheels of the trailers connected in tandem by utilizing the movements of the tractor or trailer ahead of the unit to be steered. This involves considerable mechanism, so that if a number of units are connected in tandem, the steering mechanism is, so to speak, equal in length to the combined length of the trailing units.

An object of this invention is to provide a steering mechanism for trailing units, wherein two wheels support the weight of each unit, the two wheels being controlled or steered by the unit trailing, with the exception of the rear end unit which is steered in response to movement of the next to the last unit.

Other objects and advantages reside in the construction of parts, the combination thereof and the mode of operation, as will become more apparent from the following description.

In the drawings, Figure 1 is a fragmentary, horizontal, cross sectional view through the king bolt showing the axles, the wheels and the steering mechanism therefor, together with a portion of a trailing unit.

Figure 2 is a fragmentary, perspective view of a connection between two units, viewed in the direction of the arrows 2—2 of Figure 3.

Figure 3 is a fragmentary, cross sectional view taken substantially on the line 3—3 of Figure 1.

Figure 4 is a fragmentary, cross sectional view taken substantially on the line 4—4 of Figure 3.

Figure 5 is a top plan view of portions of two trailers, with parts broken away, disclosing the steering unit used in steering the rear unit.

Figure 6 is a top schematic plan view of a series of articulated units connected to a tractor.

Figure 7 is a fragmentary cross sectional view taken substantially on the line 7—7 of Figure 5.

Referring to the drawings, the reference character 10 indicates a tractor having connected thereto in tandem the two-wheel trailers 12, 14 and 16. First, the steering mechanism used in steering the wheels under the trailers 12 and 14 will be described.

As may best be seen by referring to Figures 1 to 3, a king bolt or pin 20 is non-rotatably mounted in a plate 21 provided with pillow blocks 23 supporting a pintle or shaft 25 mounted in the leading extension 22 of the trailer 14. This arrangement permits vertical oscillatory movement between the trailers without influencing the king bolt 20. This king bolt is journalled for rotary movement in the trailing portion 24 of the trailer 12. The king bolt 20 terminates in close proximity to the transverse axle 26. The body of the trailer 12 is supported upon the axle 26 in any suitable manner by means of suitable springs or cushioning members, so that the axle 26 always extends substantially at right angles to the longitudinal axis of the main body of the trailer 12. The king bolt 20, however, does not rotate with the body of the trailer 12, but its angular position is controlled exclusively by the body of the trailer 14. A slotted member 30 is keyed to the lower end of the king pin 20 and is provided with a dovetailed slot 32, as best seen in Figure 4, having slidably mounted therein a member 34. This member 34 is provided with a threaded aperture receiving a bolt 36 adjustably mounted in a selected aperture 37 in member 38. This member 38 is fixedly secured to a transverse rod 40 having the ends thereof pivotally connected to bell crank members 42 pivotally mounted to the end of the axle 26 and terminating in pintles or axles rotatably supporting the wheels 50.

It may readily be seen from this arrangement, that if the angular relation of the trailer 12 is changed with respect to the trailer 14, the king pin 20 will then maintain the slotted member 30 aligned with the longitudinal axis of the trailer 14. As the body of the trailer 12 shifts into an azimuth angular position with respect to the trailer 14, as shown by the dotted lines in Figure 1, the axle 26 will then be in the position shown by the dotted lines in Figure 1 and the bell crank members 42 actuated into an angular position with respect to the axle 26 by member 38 having its angular position controlled by slotted member 30. That being the case, it can readily be seen that the wheels 50 will not form the same azimuth angle with respect to the longitudinal axis of member 14, as formed by the body of the trailer 12.

The relative azimuth angle of the longitudinal axis of the body of the trailer 12 and the azimuth angle of the wheels 50 may be altered by changing the bolt 36 into another hole 37. By providing a different azimuth angle for the wheels than the azimuth angle of the body, it can readily be seen that the rear end of the trailer will swing outwardly, so as to cause the wheels 50 to track with the wheels of the unit immediately ahead of the trailer 12, or approximately so.

The rear wheels of the trailer 14 are steered in a like manner by the body of the trailer 16. Due to the fact that there is no trailer to the rear of the trailer 16, it is necessary to provide another type of mechanism for steering the wheels under the trailer 16 if it is found desirable to do so. The wheels supporting the trailer 16 may be caused to track with the wheels of the trailer 14. This has been accomplished by means of a unique steering mechanism controlled by the trailer immediately ahead of the trailer 16.

The trailer 16 is fixedly attached to the king bolt or king pin 20 identical to the king bolt described in connection with Figures 1 to 3. The wheels under the trailer 14 are steered the same way as the wheels under the trailer 12. The trailer 14 is provided with a rearwardly projecting extension 60 having pivotally attached thereto a bracket 62 by a pivot 64. The bracket 62 supports a pair of parallel and contiguous leaf springs 66 and 68 which pass through an aperture 70 in a member 72 pivotally attached by means of a bracket 74 to the under side of the body of the trailer 16. Member 72 is provided with a rearwardly projecting arm 76, pivotally attached to a link 78, actuating bell crank lever or member 80 pivoted to the under side of the body of the trailer 16 by means of a pivot 82. The bell crank lever 80 is pivotally attached to a rod 84 connected to the bell crank lever 86, which bell crank lever terminates in an axle upon which the wheel 88 is journalled. The bell crank lever 86 is pivotally mounted on one end of the axle 94. The bell crank lever 86 is also connected to a steering rod 90 connected to a bracket 92 pivotally mounted upon the axle 94. Bracket 92 is pivotally attached to an axle 96 upon which the wheel 98 is journalled.

In the event the trailer 14 swings to the left, as viewed in Figure 5, it can readily be seen that the extension 60 will then swing slightly to the right, causing the leaf springs 66 and 68 to actuate member 72 in a clockwise direction about its pivot 73, thereby causing the bell crank member 80 to rotate in a counterclockwise direction, thereby actuating the bell crank member 86 in a clockwise direction with respect to the axle 94, causing the wheels 88 and 98 to swing to the rear end of the trailer 16 so as to cause the wheels 88 and 98 to track, or approach the track of the wheels under the trailer 14.

It can readily be seen by the arrangement of this link mechanism that the rear end of the trailer 16 will swing in the direction so as to cause the wheels 88 and 98 to approach the track. By providing the leaf springs 66 and 68, when there is an impact caused by an obstruction or a rut hole in the path of either the wheel 88 or 98, the leaf springs will yield or flex slightly, so as to absorb the shock. In the absence of the use of a leaf spring arrangement or a resilient connection, any obstruction under the rear wheels seems to be magnified by the time this obstructive force reaches the connection between the leading trailer and the tractor. The leaf springs function as cushioning members, so as to absorb part of the shock, thereby reducing the impact upon the other trailers and the tractor.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A tandem trailer assembly wherein a plurality of two-wheel trailers are connected in tandem, the combination including an intermediate trailer and a following trailer, a pair of steerable wheels mounted near the rear end of the intermediate trailer, and means for steering the wheels of the intermediate trailer, said steering means including a member non-rotatably attached to the immediately following trailer, a pair of bell crank members pivotally mounted under the intermediate trailer, one arm of each bell crank lever forming an axle, the wheels being rotatably mounted on the axles, a steering link for interconnecting the other arms of the pair of bell crank levers associated with the intermediate trailer, a member slidably engaging the non-rotatably mounted member and fixedly attached to the steering link so as to cause the wheels under the trailer to be steered from the immediately following trailer.

2. A tandem trailer assembly according to claim 1, wherein the member non-rotatably attached to the immediately following trailer consists of a king pin supporting a bracket for slidably engaging the member attached to the steering link.

3. A tandem trailer assembly according to claim 1, wherein one of the slidable engaging members is provided with a dovetailed slot and the other slidable engaging member is provided with a dovetailed portion slidably seated in the dovetailed slot.

4. A steering mechanism for steering two interconnected trailers wherein each of the trailers is provided with a pair of steerable wheels near the rear end thereof, said steering mechanism comprising means non-rotatably attached to the trailing trailer, means connected to said first mentioned means operable in response to the azimuth angle between the two trailers for steering the wheels under the leading trailer, and means for steering the wheels of the trailing trailer, said means including means pivotally attached to the leading trailer and means interconnecting the last mentioned means to the steerable wheels of the trailing trailer for steering the same.

5. A steering mechanism for steering the trailing trailer of two trailers pivotally interconnected, the trailing trailer having a pair of steerable wheels near the rear end thereof, said steering mechanism for the wheels under the trailing trailer including a pair of leaf springs pivotally attached to the leading trailer directly ahead, said leaf springs being pivotally attached to the rear of the pivotal connection for the trailers, a guide on the under side of the rear trailer through which the leaf springs extend, means for pivotally mounting the guide to the rear trailer, and a link mechanism extending from the guide to the rear wheels for causing the wheels of the trailing trailer to track or approach the track of the leading trailer.

CASHLY A. HENRY.

References Cited in the file of this patent

UNITED STATES PATENTS

| Number | Name | Date |
| --- | --- | --- |
| 1,024,675 | Buckwalter | Apr. 30, 1912 |

FOREIGN PATENTS

| Number | Country | Date |
| --- | --- | --- |
| 300,159 | Italy | Aug. 31, 1932 |
| 589,649 | France | Feb. 26, 1925 |